UNITED STATES PATENT OFFICE 2,397,567

CEMENTITIOUS MATERIAL

Emmitt C. Scrafford, Flint, Mich.

No Drawing. Application June 22, 1944,
Serial No. 541,665

8 Claims. (Cl. 106—89)

This invention relates to improvements in cementitious material.

The main objects of this invention are:

First, to provide a cementitious material or composition of the cement type which results in a greatly improved product as compared to commonly used cement or concrete mixtures, particularly in the matter of resistance to crushing load and disintegration under wear and atmospheric conditions.

Second, to provide a concrete mixture or cementitious mixture having these advantages which can be produced at trivial additional expense as compared to mixtures not embodying my invention.

Third, to provide a cementitious material, the production of which requires no special skill over that required for the production of concrete as commonly produced and placed.

Objects pertaining to details and economies of the invention will definitely appear from the description to follow. The invention is defined in the claims.

While my invention is particularly valuable in concrete mixtures in which hydraulic cement is the cementitious ingredient, other cementitious materials, such as lime for example, may be used for certain purposes for which such materials are commonly used, and the quality greatly improved. It is recognized that the proportions of cement, sand and aggregate are varied materially according to the particular purpose and the particular qualities sought to be attained or secured. I add the ingredients to various mixes, that is, mixes in which the proportions of the cement, sand and aggregate are substantially varied with improved results so far as the resulting concrete is concerned. I use the term "concrete" in its broad sense.

It is common to make concrete mixtures of cement, sand and aggregate such as rock, slag or other desired aggregate, the aggregate being of various dimensions according to the particular purpose for which the mixture is used. The water content is commonly such as to produce a mixture having a slump of from 1½ inches to 2 inches. I preferably provide a water content such as will result in a mixture having a slump of one-half inch or less. Mixtures having a slump of less than 1 inch are commonly regarded as harsh or relatively dry mixtures. As an example, I have secured highly satisfactory results from a mixture comprising approximately 42 parts cement, 100 parts sand, 150 parts aggregate and 45 parts water, by volume. To this mixture I add 1 part of a composition comprising sal ammoniac, salt petre, sodium chloride and sulphur in the proportions of 2½ ounces each of the sal ammoniac and salt petre and 5½ ounces each of sodium chloride and sulphur. These ingredients may be mixed dry and added to the mixture or to the water at the time of making the mix.

The quantities of the example given are stated largely as being those employed in making a testing core. It is recognized that the proportions of sand, cement and aggregate are varied in accordance with the kind or quality of sand and aggregate available or used and also in accordance with different engineering specifications. However, the proportions of sal ammoniac, salt petre, sodium chloride and sulphur need not be varied and it is not necessary to vary them according to the concrete mixes to enable obtaining very substantial improvements in the quality of the resulting product, particularly in increased crushing load, resistance, wearing qualities, increasing of porosity and greater uniformity.

I recognize that certain types of aggregate are commonly recommended by engineers for particular uses, but I have found that whatever the type or use may be, substantial advantages result from the addition of the ingredients specified. These ingredients may be varied relative to each other to a considerable extent, but I have specified proportions securing highly satisfactory results. While the example given is a cementitious material employing hydraulic cement, it is desired to point out that other water setting cementitious materials may be employed, such for example as lime mixed with sand or other ingredient as is common practice, the added materials being incorporated in relatively small amounts or in relatively small ratio to the other ingredients in all cases.

I do not undertake to set forth the effect or action of each ingredient or combination of ingredients in the composition but the use thereof results in a greatly improved product. For example, in certain tests conducted in the usual manner by experienced persons and with the same equipment the crushing load of cores embodying the invention ranged as high as 132,500 pounds as compared to a crushing load of 62,500 pounds for cores not embodying the invention, made at the same time with the same materials and in as nearly the same proportions as practical to combine them. It is also pointed out that the tests were made by others than the applicant.

I have not attempted to point out all the various ranges and adaptations of my invention as it is believed this disclosure will enable those skilled in the art to practice my invention in a practical and satisfactory manner.

Having thus described my invention what I claim as new and desire to secure by Letters Patent is:

1. A cement composition of the hydraulic cement type comprising approximately 2½ ounces sal ammoniac, 2½ ounces salt petre, 5½ ounces sodium chloride, and 5½ ounces sulphur, in the proportions of approximately 1 pound of the combined ingredients to 50 pounds of the hydraulic cement.

2. A cementitious material comprising hydraulic cement, sal ammoniac, salt petre, sodium chloride and sulphur, in the proportions of approximately 50 pounds of cement, 2½ ounces sal ammoniac, 2½ ounces salt petre, 5½ ounces sodium chloride, and 5½ ounces sulphur.

3. A Portland cement composition comprising Portland cement and having incorporated therein as added ingredients, sal ammoniac, salt petre, sodium chloride and sulphur, in approximately the proportions of 1 part by volume of the combined added ingredients to 350 parts of combined water, cement, sand and aggregate, the sal ammoniac and salt petre being approximately in the ratio by volume of one part each to two parts each of sodium chloride and sulphur.

4. A cementitious material comprising hydraulic cement to which has been added as ingredients, sal ammoniac, salt petre, sodium chloride, and sulphur in relatively small proportions as compared to the cement, each of said added ingredients being relatively small as compared to the total of said added ingredients.

5. A cementitious composition comprising a cementing material selected from the group consisting of hydraulic cement and lime, to which has been added as ingredients, sal ammoniac, salt petre, sodium chloride and sulphur in relatively small proportions as compared to the water setting material, each of said added ingredients being relatively small as compared to the total of said added ingredients.

6. A cementitious material selected from the group consisting of hydraulic cement and lime, to which has been added sal ammoniac, salt petre, sodium chloride and sulphur in the proportions of approximately 2½ ounces sal ammoniac, 2½ ounces salt petre, 5½ ounces sodium chloride and 5½ ounces sulphur, the ratio of such added ingredients to the total ingredients being relatively small.

7. A concrete mixture comprising hydraulic cement, sand and aggregate and water in the proportions of approximately 150 parts aggregate, 100 parts sand, 50 parts cement, and 45 parts water by volume, to which has been added 1 part by volume of a mixture of sal ammoniac, salt petre, sodium chloride and sulphur in the proportions of 2½ ounces sal ammoniac, 2½ ounces salt petre, 5½ ounces sodium chloride and 5½ ounces sulphur.

8. A composition for use in hydraulic cement compositions comprising sal ammoniac, salt petre, sodium chloride and sulphur in approximately the proportions of 1 part each of sal ammoniac and salt petre and 2 parts each of sodium chloride and sulphur.

EMMITT C. SCRAFFORD.